United States Patent
Lin

(10) Patent No.: US 9,274,296 B2
(45) Date of Patent: Mar. 1, 2016

(54) OPTICAL FIBER CONNECTOR AND OPTICAL FIBER COUPLING ASSEMBLY HAVING SAME

(75) Inventor: I-Thun Lin, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 1203 days.

(21) Appl. No.: 13/221,872

(22) Filed: Aug. 30, 2011

(65) Prior Publication Data

US 2013/0004124 A1    Jan. 3, 2013

(30) Foreign Application Priority Data

Jun. 28, 2011 (TW) .............................. 100122690 A

(51) Int. Cl.
| | |
|---|---|
| G02B 6/36 | (2006.01) |
| G02B 6/42 | (2006.01) |
| G02B 6/26 | (2006.01) |
| G06F 13/40 | (2006.01) |

(52) U.S. Cl.
CPC ............... *G02B 6/4292* (2013.01); *G02B 6/26* (2013.01); *G06F 13/4045* (2013.01)

(58) Field of Classification Search
CPC ........................................................ G02B 6/26
See application file for complete search history.

(56) References Cited

U.S. PATENT DOCUMENTS

| | | | |
|---|---|---|---|
| 2009/0202244 A1* | 8/2009 | Jin et al. ........................ | 398/67 |
| 2009/0216922 A1* | 8/2009 | Park et al. ........... | G06F 13/4045 710/63 |
| 2012/0014648 A1* | 1/2012 | Duis et al. ...................... | 385/52 |

FOREIGN PATENT DOCUMENTS

| | | |
|---|---|---|
| CN | 1426182 A | 6/2003 |
| JP | 2009210669 A | 9/2009 |
| TW | 200802417 A | 1/2008 |
| WO | 2011051686 A1 | 5/2011 |

* cited by examiner

*Primary Examiner* — Michelle R Connelly
*Assistant Examiner* — Hoang Tran
(74) *Attorney, Agent, or Firm* — Novak Druce Connolly Bove + Quigg LLP

(57) ABSTRACT

An optical fiber connector includes a body and a photoelectric conversion module received in the body. The photoelectric conversion module includes a base, a light emitting unit, a light receiving unit, and a light coupling block. The light emitting unit and the light receiving unit are fixed on the base. The light coupling blocks are formed on the base and are arranged over the light emitting unit and the light receiving unit. The light emitting unit is configured for emitting light to the light coupling block in a first direction. The light coupling block is configured for reflecting the light from the light emitting unit to a second direction perpendicular to the first direction. The light receiving unit is configured for receiving light emitting from the light coupling block in a direction opposite to the first direction.

3 Claims, 5 Drawing Sheets

OPTICAL FIBER CONNECTOR AND OPTICAL FIBER COUPLING ASSEMBLY HAVING SAME

BACKGROUND

1. Technical Field

The present disclosure relates to optics and, particularly, to an optical fiber connector and an optical fiber coupling assembly having such an optical fiber connector.

2. Description of Related Art

An optical fiber coupling assembly is preferred for use in data transmission between many electronic devices due to its high transmission speed and signal integrity. Generally, the optical fiber coupling assembly includes two optical fiber connectors and two photoelectric conversion modules corresponding to the optical fiber connectors. Each optical fiber connector includes a body having a number of blind holes, a number of optical lenses positioned on a light incident surface of the body, and a number of optical fibers received in the respective blind holes and aligned with the respective optical lenses. Each photoelectric conversion module includes a light emitting unit, a light receiving unit, and a light coupling block.

When in use, each photoelectric conversion module is coupled with the corresponding optical fiber connector, and two optical fiber connectors are coupled with each other, as well the optical fibers are received in the respective optical fiber connectors and are coupled together to allow optical transmittance between the optical fibers. However, light emitting from each light emitting unit reaches the corresponding light receiving unit only after passing through a first light coupling block, a first optical fiber, a first optical lens, a second optical lens, a second optical fiber, and a second light coupling block. The light path is complex because of the number of refracting interfaces and this decreases transmission efficiency.

Therefore, it is desirable to provide an optical fiber connector and an optical fiber coupling assembly having the optical fiber connector, which can overcome or alleviate the above-mentioned problems.

DETAILED DESCRIPTION

Figure 1:
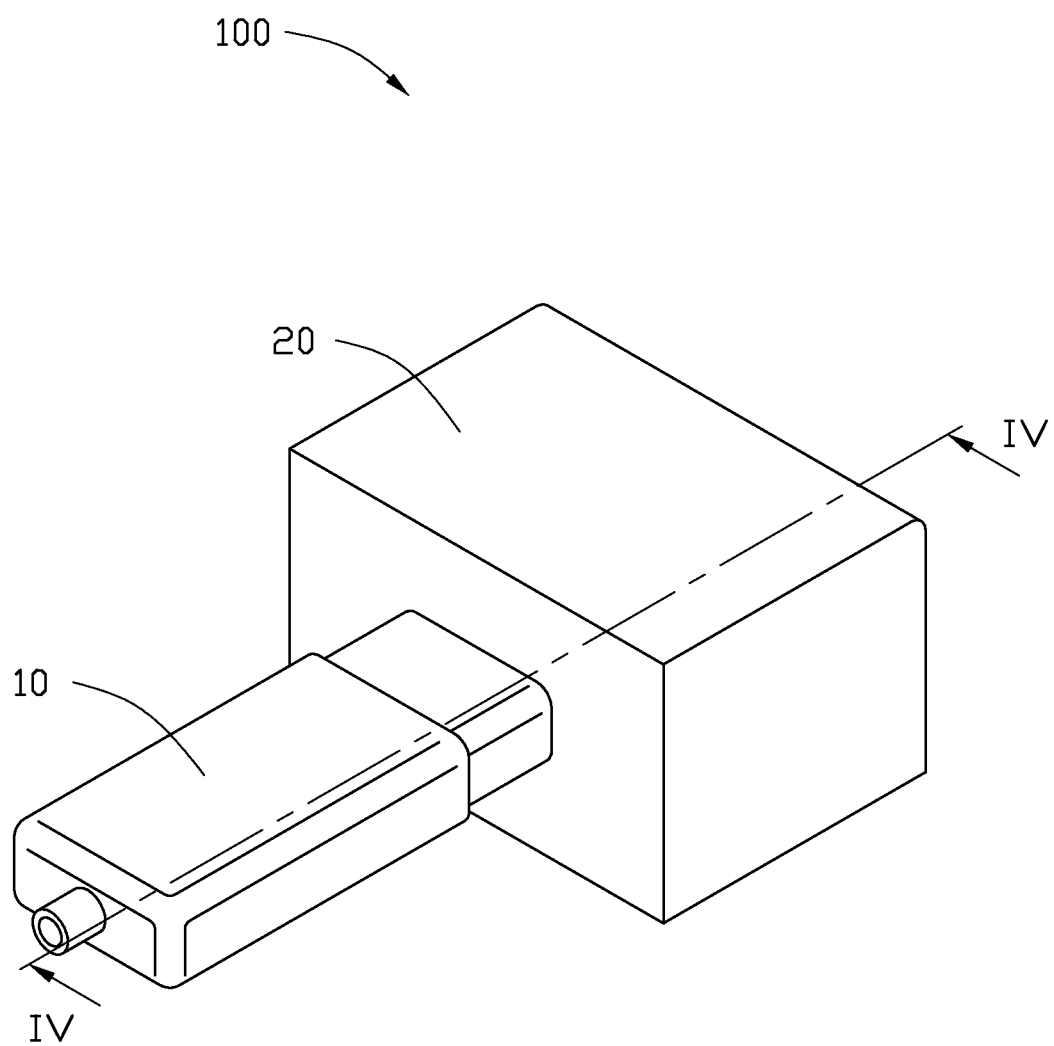
FIG. 1 is a schematic, isometric view of an optical fiber coupling assembly, according to an exemplary embodiment.

Referring to FIG. 1, an optical fiber coupling assembly 100, according to an exemplary embodiment, includes a first optical fiber connector 10 and a second optical fiber connector 20. The first optical fiber connector 10 couples with the second optical fiber connector 20 to allow the passage of light in the form of digital signals.

Figure 2:
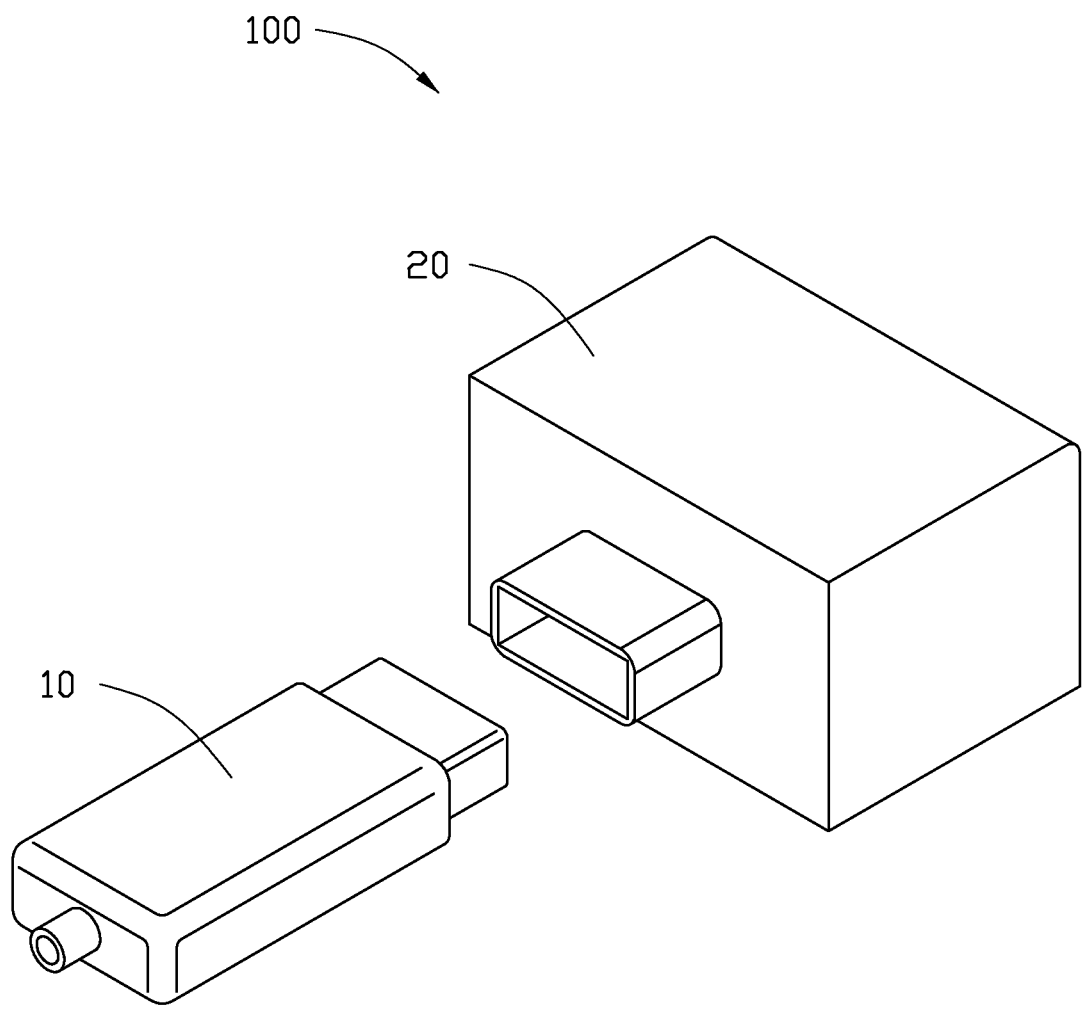
FIG. 2 is a view of the optical fiber coupling assembly of FIG. 1 disassembled.
Figure 3:
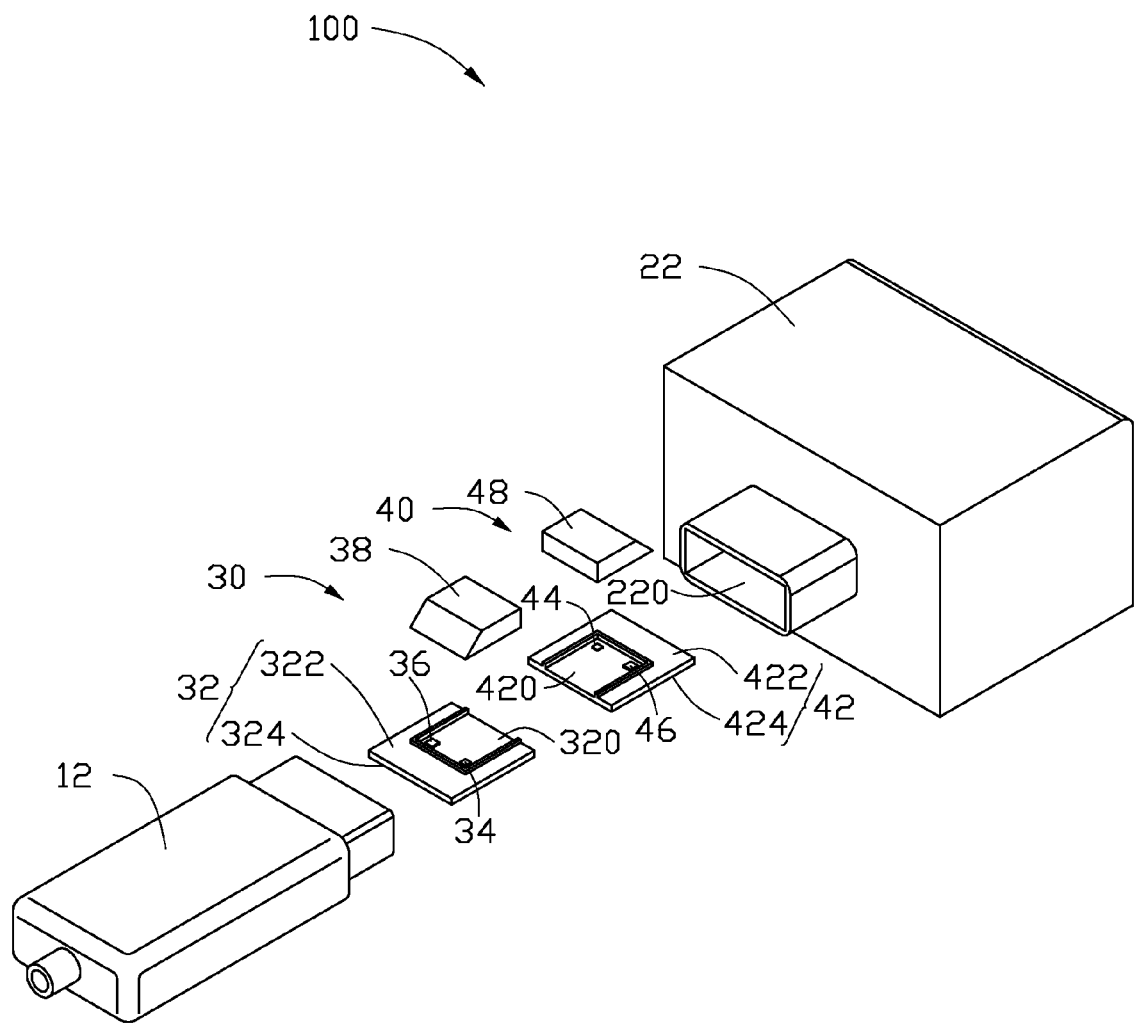
FIG. 3 is an exploded view of the optical fiber coupling assembly of FIG. 1.

Referring to FIGS. 2-3, the first optical fiber connector 10 includes a first body 12 and a first photoelectric conversion module 30.

The first body 12 defines a first receiving hole 120. In this embodiment, the first receiving hole 120 is rectangular and blind. The first receiving hole 120 includes a first top wall 122, a first bottom wall 124, and a first sidewall 126. The first top wall 122 is substantially parallel to the first bottom wall 124. The first sidewall 126 perpendicularly connects the first top wall 122 to the first bottom wall 124.

The first photoelectric conversion module 30 is received in the first receiving hole 120. The first photoelectric conversion module 30 includes a first base 32, a first light emitting unit 34, a first light receiving unit 36, and a first light coupling block 38.

The first base 32 includes an upper surface 322 and a lower surface 324 opposite to the upper surface 322. A first groove 320 is defined in the upper surface 322. The lower surface 324 is supported by the first bottom wall 124.

The first light emitting unit 34 and the first light receiving unit 36 are positioned in the first groove 320 and apart from each other. In this embodiment, the first light emitting unit 34 is a vertical cavity surface emitting laser diode (VCSEL) and is configured for emitting light. The first light receiving unit 36 is a photo diode and is configured for receiving light.

Figure 4:
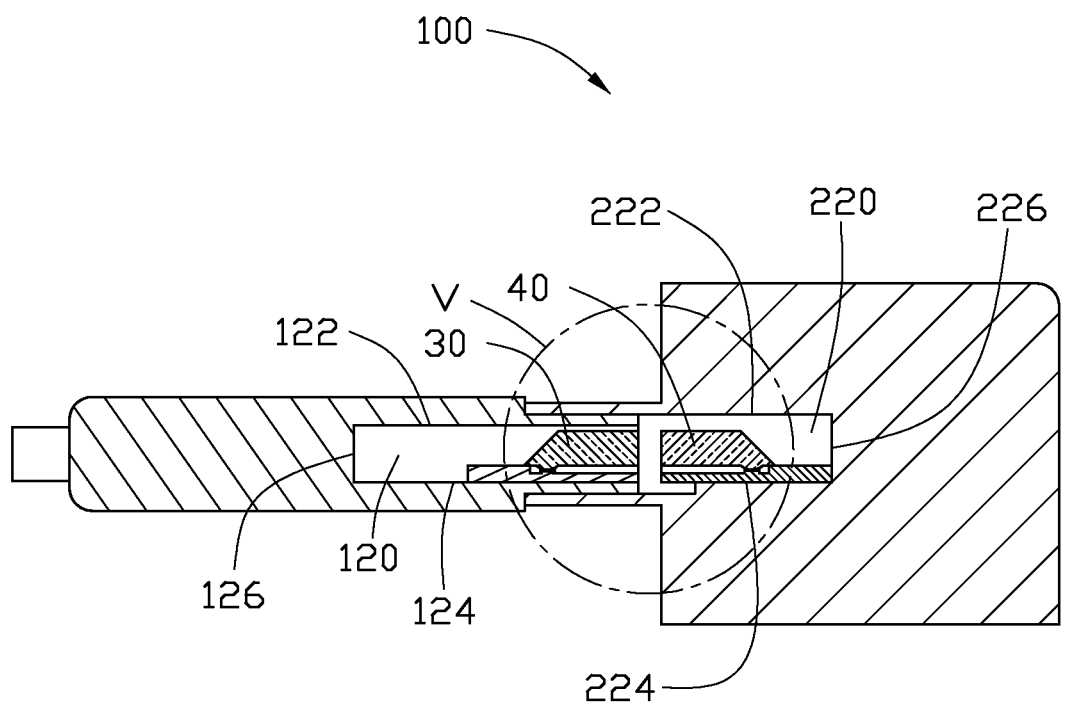
FIG. 4 is a sectional view taken along line IV-IV of the optical fiber coupling assembly of FIG. 1.
Figure 5:
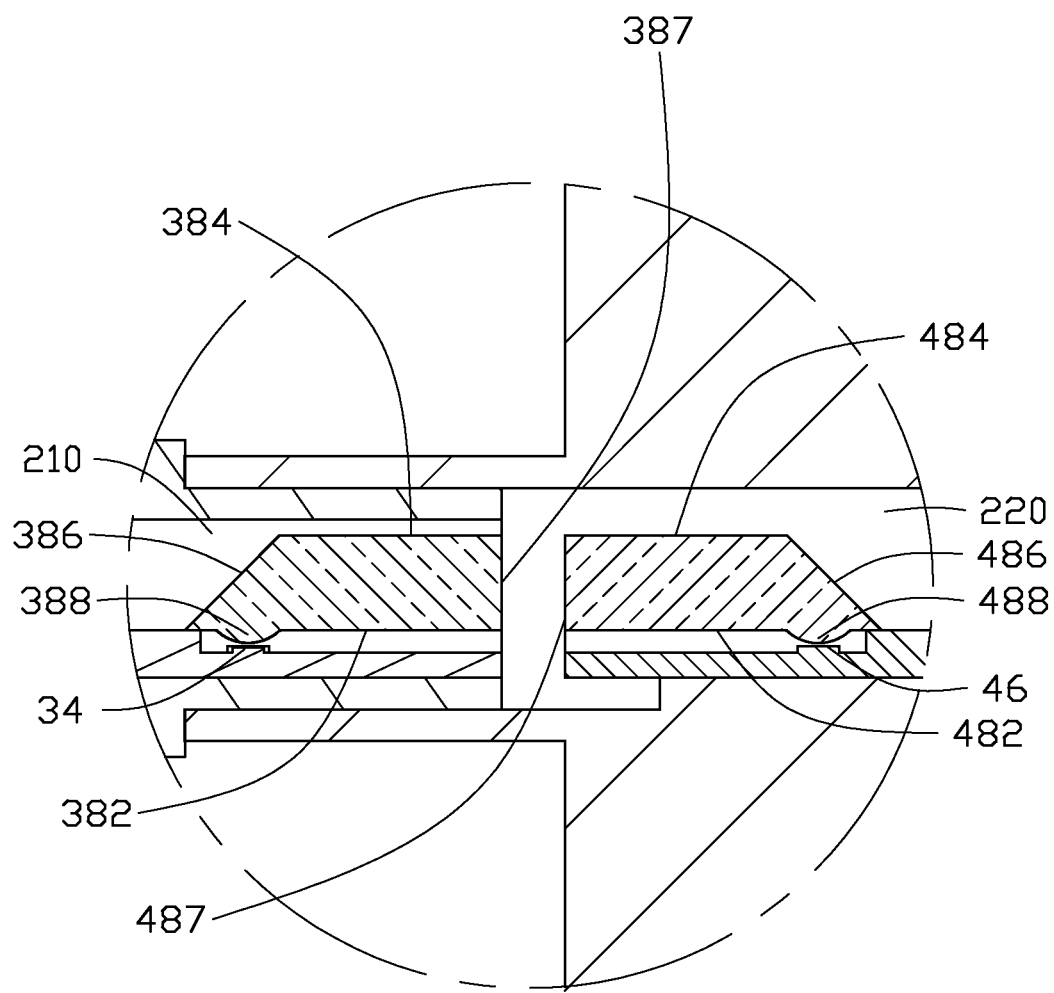
FIG. 5 is an enlarged view of section V of the optical fiber coupling assembly of FIG. 4.

Referring to FIGS. 4-5, the first light coupling block 38 includes a first horizontal surface 382, a second horizontal surface 384, a first slanted surface 386, a first vertical surface 387, and two first outwardly curved surfaces 388. The first horizontal surface 382 is substantially parallel to the second horizontal surface 384. The first light coupling block 38 seals the first groove 320 and the first horizontal surface 382 is supported by the upper surface 322. The first slanted surface 386 and the first vertical surface 387 are positioned at opposite sides of the first light coupling block 38 and connect the first horizontal surface 382 to the second horizontal surface 384. The first slanted surface 386 is adjacent to the first sidewall 126. The two first outwardly curved surfaces 388 protrude from the first horizontal surface 382 and are aligned with the first light emitting unit 34 and the first light receiving unit 36, respectively. The two first outwardly curved surfaces 388 correspond to the first slanted surface 386.

Referring to FIGS. 2-3, the second optical fiber connector 20 includes a second body 22 and a second photoelectric conversion module 40.

The second body 22 defines a second receiving hole 220 corresponding to the first receiving hole 120. In this embodiment, the second receiving hole 220 is rectangular and blind. The second receiving hole 220 includes a second top wall 222, a second bottom wall 224, and a second sidewall 226. The second top wall 222 is substantially parallel to the second bottom wall 224. The second sidewall 226 perpendicularly connects the second top wall 222 to the second bottom wall 224.

The second photoelectric conversion module 40 is received in the second receiving hole 220. The second photoelectric conversion module 40 includes a second base 42, a second light emitting unit 44, a second light receiving unit 46, and a second light coupling block 48.

The second base 42 includes a top surface 422 and a bottom surface 424 opposite to the top surface 422. A second groove 420 is defined in the top surface 422. The bottom surface 424 is supported by the second bottom wall 224.

The second light emitting unit 44 and the second light receiving unit 46 are positioned in the second groove 420 and apart from each other. In this embodiment, the second light emitting unit 44 is a vertical cavity surface emitting laser diode (VCSEL) and is configured for emitting light. The second light receiving unit 46 is a photo diode and is configured for receiving light.

Referring to FIGS. 4-5, the second light coupling block 48 is aligned with the first light coupling block 38. The second light coupling block 48 includes a third horizontal surface 482, a fourth horizontal surface 484, a second slanted surface 486, a second vertical surface 487, and two second outwardly curved surfaces 488. The third horizontal surface 482 is substantially parallel to the fourth horizontal surface 484. The second light coupling block 48 seals the second groove 420 and the third horizontal surface 482 is supported by the top surface 422. The second slanted surface 486 and the second vertical surface 487 are positioned at opposite sides of the second light coupling block 48 and connect the third horizontal surface 482 to the fourth horizontal surface 484. The second slanted surface 486 is adjacent to the second sidewall 226. The second outwardly curved surfaces 488 protrude from the third horizontal surface 482 and are aligned with the second light emitting unit 44 and the second light receiving unit 46, respectively. The second outwardly curved surfaces 488 correspond to the second slanted surface 486.

In another embodiment, the second horizontal surface 384 of the first light coupling block 38 is attached on the first top wall 122 with adhesive, and the first outwardly curved surfaces 388 aligns with the first light emitting unit 34 and the first light receiving unit 36, respectively. The fourth horizontal surface 484 of the second light coupling block 48 is attached on the second top wall 222 with adhesive, and the second outwardly curved surfaces 488 aligns with the second light emitting unit 44 and the second light receiving unit 46, respectively.

In assembly, the first optical fiber connector 10 is inserted into the second optical fiber connector 20. The first top wall 122 contacts the second top wall 222. The first bottom wall 124 contacts the second bottom wall 224. The first receiving hole 120 is aligned with the second receiving hole 220, and the first light coupling block 38 is aligned with the second light coupling block 48.

When in use, if the first optical fiber connector 10 is used as an emitting terminal and the second optical fiber connector 20 is used as a receiving terminal, the light emitted from the first light emitting unit 34 passes through the corresponding first outwardly curved surface 388 and is reflected by the first slanted surface 386 and the second slanted surface 486 toward the corresponding second outwardly curved surface 488, and reaches the second light receiving unit 46. If the first optical fiber connector 10 is used as a receiving terminal, and the second optical fiber connector 20 is used as an emitting terminal, light emitted from the second light emitting unit 44 passes through the corresponding second outwardly curved surface 488 and is reflected by the second slanted surface 486 and the first slanted surface 386 toward the corresponding first outwardly curved surface 388, and reaches the first light receiving unit 36. During this process, the light path is less complex as the number of the refracting interfaces is reduced. This increases the transmission efficiency of the optical fiber coupling assembly 100.

Even though numerous characteristics and advantages of the present embodiments have been set fourth in the foregoing description, together with details of the structures and functions of the embodiments, the disclosure is illustrative only, and changes may be made in details, especially in the matters of shape, size, and the arrangement of parts within the principles of the disclosure to the full extent indicated by the broad general meaning of the terms in which the appended claims are expressed.

What is claimed is:

1. An optical fiber coupling assembly comprising:
a first optical fiber connector comprising:
  a first body; and
  a first photoelectric conversion module received in the first body, the first photoelectric conversion module comprising a first base, a first light emitting unit, a first light receiving unit, and a first light guiding block, the first base comprising an upper surface and an opposing lower surface, a first groove defined in the upper surface, the first light emitting unit and the first light receiving unit received in the first groove, the first light guiding block contacting the upper surface and disposed above the first groove to cover and seal the first groove, the first light emitting unit, and the first light receiving unit; and
a second optical fiber connector comprising:
  a second body; and
  a second photoelectric conversion module received in the second body, the second photoelectric conversion module comprising a second base, a second light emitting unit, a second light receiving unit, and a second light guiding block, the second light emitting unit and the second light receiving unit fixed on the second base, the second light coupling block disposed above the second light emitting unit and the second light receiving unit, the first light guiding block optically aligned with the second light guiding block, the first light guiding block configured for receiving and directing light emitted from the first light emitting unit to the second light guiding block, the second light guiding block configured for receiving and directing light emitted from the second light emitting unit to the first light guiding block, the first light guiding block configured for receiving and directing the light from the second light guiding block to the first light receiving unit, the second light guiding block configured for receiving and directing the light from the first light guiding block to the second light receiving unit;
wherein the first body defines a first receiving hole, the first receiving hole is substantially rectangular and blind, the first body comprises a first top wall, a first bottom wall, and a first sidewall in the first receiving hole, the first top wall is substantially parallel to the first bottom wall, the first sidewall perpendicularly connects the first top wall to the first bottom wall, and the lower surface contacts the first bottom surface, the first light guiding block comprises a first horizontal surface, a second horizontal surface parallel to the first horizontal surface, a first slanted surface, a first vertical surface, and two first outwardly curved surfaces, the first horizontal surface contacts the upper surface, the second horizontal surface faces and is spaced apart from the first top wall, the first slanted surface is adjacent to the first sidewall, the first slanted surface and the first vertical surface are positioned at opposite sides of the first light guiding block and connect the first horizontal surface to the second horizontal surface, and the first outwardly curved surfaces protrude from the first horizontal surface and are aligned with the first light emitting unit and the first light receiving unit.

2. An optical fiber connector comprising:
a body; and
a photoelectric conversion module received in the body, the photoelectric conversion module comprising a base, a light emitting unit, a light receiving unit, and a light coupling block, the base comprising an upper surface and an opposing lower surface, a groove defined in the upper surface, the light emitting unit and the light receiving unit received in the groove, the light coupling block formed contacting the upper surface and arranged above the groove to cover and seal the groove, the light emitting unit, and the light receiving unit, the light emitting unit configured for emitting light to the light coupling block in a first direction, the light coupling block configured for reflecting the light from the light emitting unit to a second direction perpendicular to the first direction, and the light receiving unit configured for receiving light emitted from the light coupling block in a direction opposite to the first direction;

wherein the body defines a receiving hole, the receiving hole is substantially rectangular and blind, the body comprises a top wall, a bottom wall, and a sidewall in the receiving hole, the top wall is substantially parallel to the bottom wall, the sidewall perpendicularly connects the top wall to the bottom wall, and the lower surface contacts the bottom surface, the light coupling block comprises a first horizontal surface, a second horizontal surface parallel to the first horizontal surface, a slanted surface, a vertical surface, and two outwardly curved surfaces, the first horizontal surface contacts the upper surface, the second horizontal surface faces and is spaced apart from the top wall, the slanted surface is adjacent to the sidewall, the slanted surface and the vertical surface are positioned at opposite sides of the light coupling block and connect the first horizontal surface to the second horizontal surface, and the outwardly curved surfaces protrude from the first horizontal surface and are aligned with the light emitting unit and the light receiving unit.

3. An optical fiber connector comprising:

a body; and a photoelectric conversion module received in the body, the photoelectric conversion module comprising a base, a light emitting unit, a light receiving unit, and a light coupling block, the base comprising an upper surface and an opposing lower surface, a groove defined in the upper surface, the light emitting unit and the light receiving unit received in the groove, the light coupling block being spaced apart the upper surface and arranged above the groove to cover and align with the groove, the light emitting unit, and the light receiving unit, the light emitting unit configured for emitting light to the light coupling block in a first direction, the light coupling block configured for reflecting the light from the light emitting unit to a second direction perpendicular to the first direction, and the light receiving unit configured for receiving light emitted from the light coupling block in a direction opposite to the first direction;

wherein the body defines a receiving hole, the receiving hole is substantially rectangular and blind, the body comprises a top wall, a bottom wall, and a sidewall in the receiving hole, the top wall is substantially parallel to the bottom wall, the sidewall perpendicularly connects the top wall to the bottom wall, and the lower surface contacts the bottom surface, the light coupling block comprises a first horizontal surface, a second horizontal surface parallel to the first horizontal surface, a slanted surface, a vertical surface, and two outwardly curved surfaces, the first horizontal surface is spaced apart from the upper surface, the second horizontal surface is attached on the top wall with adhesive, the slanted surface is adjacent to the sidewall, the slanted surface and the vertical surface are positioned at opposite sides of the light coupling block and connect the first horizontal surface to the second horizontal surface, and the outwardly curved surfaces protrude from the first horizontal surface and are aligned with the light emitting unit and the light receiving unit.

\* \* \* \* \*